United States Patent

[11] 3,577,080

[72] Inventor Gary A. Cannalte
Hoffman Estates, Ill.
[21] Appl. No. 785,526
[22] Filed Dec. 20, 1968
[45] Patented May 4, 1971
[73] Assignee Motorola, Inc.
Franklin Park, Ill.

[54] REMOTE CONTROL SYSTEM FOR OPERATION OVER SAME AUDIOCHANNEL PROVIDING VOICE SIGNALS BETWEEN REMOTE STATION AND BASE STATION
20 Claims, 5 Drawing Figs.

[52] U.S. Cl. ........................................................ 325/183, 325/64, 325/133, 340/171, 340/177
[51] Int. Cl. ........................................................ H04b 1/60
[50] Field of Search ............................................ 325/37, 64, 183, 100, 101, 133, 59; 340/163, 171, 177—309.1, 310, 309.2; 178/66; 179/2, 2 (R), 2 (RC), 84(C)

[56] References Cited

UNITED STATES PATENTS

| | | | |
|---|---|---|---|
| 2,630,525 | 3/1953 | Tomberlin et al. ........... | 325/64 |
| 3,316,488 | 4/1967 | Reynolds ..................... | 340/171X |
| 3,458,815 | 7/1969 | Becker ......................... | 333/16X |
| 3,472,965 | 10/1969 | Blossom ....................... | 178/66X |

OTHER REFERENCES

" Pulsed Tones Control A-M and F-M Stations" ; In ELECTRONICS for September 1955; pp.132— 136 (copy in class 325- 183)

*Primary Examiner*—Benedict V. Safourek
*Attorney*—Mueller and Aichele

ABSTRACT: Remote control system for controlling radio at base station from remote point over single audio channel which provides voice signals between remote and base stations, and which does not require DC continuity and operates within a fixed maximum frequency. A short burst of high amplitude guard tone is applied over the channel from the remote station to the base station to actuate a control at the base station which renders the controls thereat operative and blocks transmission of audiosignals from the base station to the channel. The remote station then applies lower amplitude tones to the audiochannel to actuate controls at the base station, with guard tone being applied continuously at low level during application of audio signals from the remote station to the base station. The base station responds to termination of tone signals (or to disconnect tones) to provide disconnect action, reset the controls and permit the base station to apply signals to the audio channel.

PATENTED MAY 4 1971 3,577,080

INVENTOR
GARY A. CANNALTE

BY Mueller, Aichele & Rauner

ATTYS.

INVENTOR
GARY A. CANNALTE

BY Mueller, Aichele & Rauner

ATTYS.

INVENTOR
GARY A. CANNALTE

BY Mueller, Aichele & Rauner

ATTYS.

INVENTOR
GARY A. CANNALTE
BY Mueller, Aichele & Rauner
ATTYS.

REMOTE CONTROL SYSTEM FOR OPERATION OVER SAME AUDIOCHANNEL PROVIDING VOICE SIGNALS BETWEEN REMOTE STATION AND BASE STATION

BACKGROUND OF THE INVENTION

It is common practice to locate a radio transmitter at a point separate from the controlling point. This may be a point of high elevation such as a hill or mountain, or the top of a building, so that the signals are radiated therefrom at a high elevation for more effective transmission. It is generally not desired to have an operator at the transmitter, and therefore, the operation of the transmitter must be controlled from a remote point. In prior systems control channels were provided between the remote station and the transmitter which were separate from the channel providing audiosignals therebetween, or when the same channel was used, the control signals have been provided by the application of direct current potentials over the audiosignal channel.

In order to reduce the cost of the channel required between the remote station and the base station transmitter, it is desired to use a commercially available audiochannel which does not have direct current continuity, and for this reason direct current control signals cannot be used. Also, many audiochannels commercially available have a maximum frequency limit which permits transmission of only the lower portion of the audiospectrum thereover. For example, many audio channels provide efficient signal transmission for frequencies only up to about 2200 hertz, or 2500 hertz, and signals above this frequency are substantially attenuated. Further, the transmission of high amplitude audiosignals on these audiochannels is not permitted, except for very short time durations.

SUMMARY OF THE INVENTION

It is an object of the present invention to provide a remote control system for controlling a base station from a remote point wherein tone control signals are applied over the same audio channel which transmits audio signals in both directions between the base station and the remote point.

Another object of the invention is to provide a remote control system for use over an audiochannel wherein a high amplitude short duration burst of tone is applied from the remote station to the base station to actuate a detector at the base station which enables control means thereat and blocks application to the channel of audiosignals from the base station.

A further object of the invention is to provide a remote control system for applying signals to control equipment at a base station from a remote station, wherein the remote station applies oscillations of a first frequency at a high amplitude for a short duration to enable control equipment at the base station, followed by oscillations of different frequencies at a lower level to actuate the control means at the base station, with the first oscillations being continued at a low level during transmission of audio signals from the remote station to the base station.

A still further object of the invention is to provide a remote control system operating through tone oscillations applied from a remote station to a base station, wherein the base station responds to the termination of signals from the remote station to provide disconnect action to condition the equipment at the base station for further control action and for applying signal from the base station over the audio channel to the remote station.

Still another object of the invention is to provide a remote control system wherein tones are applied over an audiochannel to control equipment at a base station, and wherein disconnect tones are transmitted at the end of a transmission to release the base station equipment.

In accordance with the invention a remote control system is provided for controlling radio equipment at a base station, or other equipment thereat, from a remote point over the same audiochannel over which audiosignals are communicated back and forth between the remote station and the base station. In order to be able to use an audiochannel which does not have direct current continuity, and has a maximum transmission frequency of the order of 2200 hertz, alternating current tone control signals below this frequency are used. The remote station includes a tone control encoder having a guard tone oscillator providing a frequency of 2175 hertz, for example, and a second oscillator with tuning elements for providing function tones in the range from 600 to 2000 hertz.

The control system includes a push-to-talk switch for initiating voice transmission, and a plurality of selectors for performing desired controls. Operation of the push-to-talk switch initiates operation of a first timer which causes the guard tone to be transmitted for a first time period, such as 100 milliseconds. At the end of this time period an attenuator is inserted in the output of the guard tone oscillator so that the guard tone continues at greatly reduced level as long as the transmission takes place. To select the frequency of transmission the control unit connects a particular tuning element in the second tone oscillator circuit, and a second timer causes this tone to be transmitted for a shorter time period, such as 25 milliseconds, following the first time period. By operation of other selectors the system can be used to transmit tones for other functions at the base station.

At the base station a guard tone detector responds to the burst of guard tone and initiates a timer to apply the following function tones to selectors, and also operates to key the transmitter and block any transmission from the base station over the audiochannel. The guard tone burst is of high level so that if it is applied in the presence of an audiosignal from the base station to the transmitter, the tone will override the audiosignal to actuate the guard tone detector. This high amplitude tone has a very short time duration so that it presents no problem on the audiochannel. The function tone is then received and detected to control the frequency of the transmitter or to provide another function as desired. The equipment at the base station includes an activity checker which resets the tone control decoder at the end of the received control signal. During a voice transmission, the guard tone is transmitted during the entire transmission and the termination of the guard tone is sensed by the activity checker to reset the decoder. In the event the control provides a nontransmit function, the activity checker will respond to the termination of the function tone to reset the system.

Alternatively, disconnect tones can be transmitted from the remote station to the base station at the end of each transmission, which constitute alternate tones of two different frequencies. These may be at frequencies of 1500 hertz and 2000 hertz when used with an audiochannel which passes frequencies up to 2200 hertz.

DESCRIPTION OF THE PREFERRED EMBODIMENTS

Figures 1, 2:
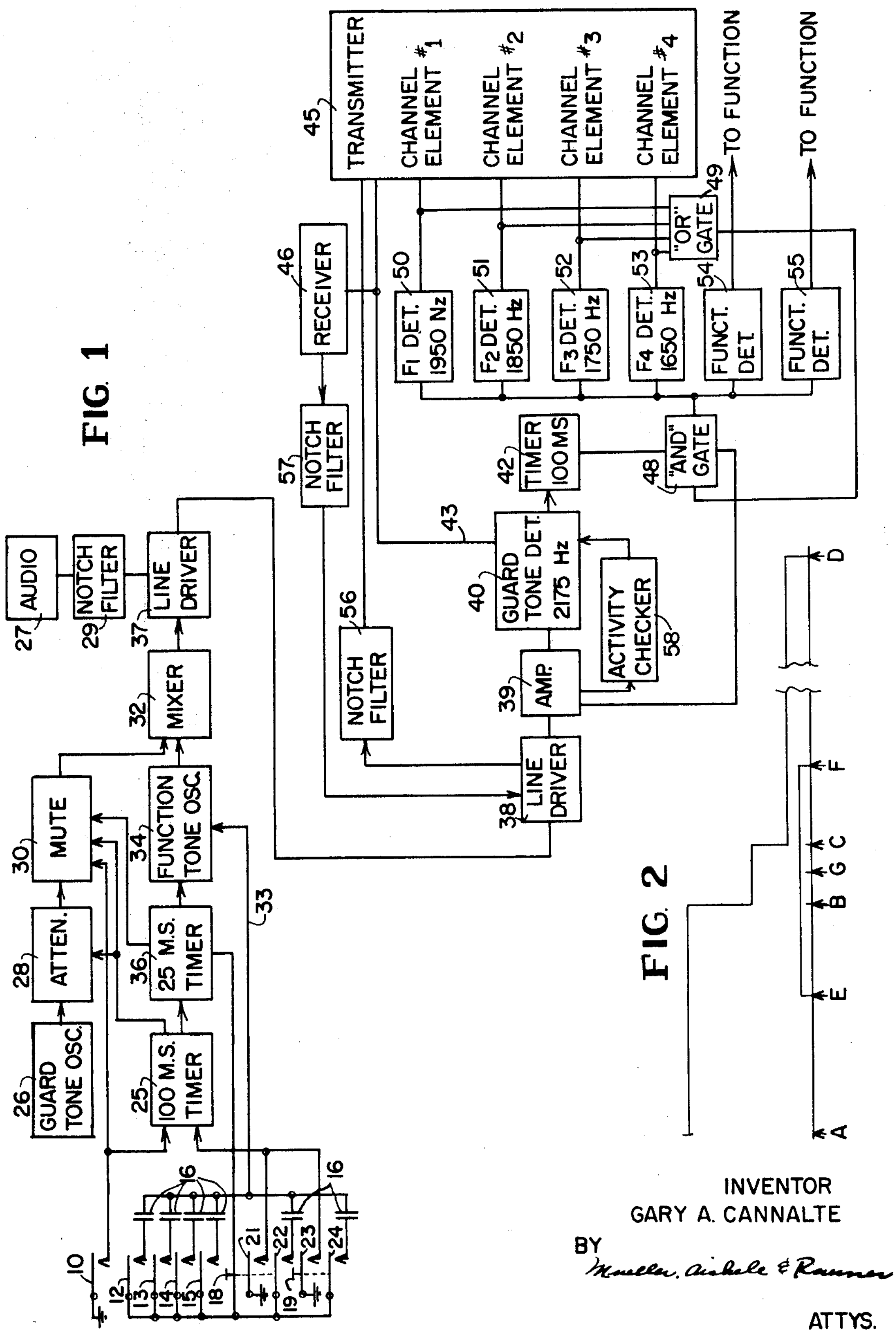
FIG. 1 is a block diagram of the remote control system of the invention.
FIG. 2 is a chart illustrating the operation of the remote control system of FIG. 1.

Referring to FIG. 1, this shows the tone operated remote control system including the encoder which is located at the remote station and the decoder which is located at the base station. The encoder includes switch 10 which functions as a push-to-talk switch to initiate a voice transmission at the base station transmitter. Switches 12, 13, 14 and 15 are used to control the frequency of transmission of the transmitter, with one of the switches being operated prior to operation of the push-to-talk switch 10 to select the frequency of transmission.

Selectors 18 and 19 are provided at the remote station for controlling functions at the base station other than voice transmissions. These may be used to select a particular one of a group of receivers or a predetermined squelch level, or type of operation at the selected receiver, to control the power of the transmitter, to switch from one power supply to another, or from one antenna to another, or to provide any other function which may be desired. The selectors 18 and 19 each have two ganged switches, with selector 18 having switches 21 and 22, and selector 19 having switches 23 and 24.

The control circuit includes a first timer 25 which may provide a time interval of 100 milliseconds. This timer is triggered by the push-to-talk switch 10, or by one of the switches 21 and 23 of the function selectors. The timer 25 controls the tone transmissions from guard tone oscillator 26. The guard tone oscillator provides a tone signal at a frequency such as 2175 hertz, and which may be at a relatively high amplitude. The oscillator output is applied to the attenuator 28 which may attenuate the tone signals by 30 decibels. This attenuator is adapted to be inhibited by a control from the timer 25 during its 100 millisecond period. The output of the attenuator 28 is applied through the guard tone mute circuit 30 to the mixer 32. The mute circuit 30 is inhibited by action of the push-to-talk switch 10. The output of mixer 32 is applied to line driver 37.

Audio signals are applied from audio circuit 27 through notch filter 29 to the line driver 37, and are transmitted thereby to the base station along with the tone signals used for remote control. Audiosignals received from the base station by the line driver 37 are also applied through notch filter 29 to the audio circuit 27. The notch filter 29 removes components at 2175 hertz from speech applied to the system so that it will not interfere with the guard tone and cause falsing of the guard tone detector at the base station.

The tone control encoder includes a second oscillator 34 for providing the control tones for various functions to be performed at the base station. The output of this oscillator is also applied to the mixer 32. A second timer 36 is actuated by the timer 25 at the end of the first time period. This initiates a second time period which may be of the order of 25 milliseconds. The timer 36 actuates the function tone oscillator 34 and applies a ground to the switches 12 to 15, 22 and 24 to complete the circuit for tuning capacitors 16 which are connected to the oscillator 34 to control the frequency thereof. Only one of the switches 12 to 15, 22 and 24 will be operated at a time, and each switch is connected with a capacitor 16 to complete the circuit through such capacitor and conductor 33 to the function tone oscillator 34 to control the frequency thereof. The second timer 36 also actuates the mute circuit 30 to block the transmission of guard tone to the mixer 32 during the transmission of the function tone.

Considering now the operation of the encoder, when the push-to-talk switch 10 is actuated for a voice transmission, the operation of the switch will initiate operation of the timer 25 and will also apply an inhibit signal to the guard tone mute 30 so that this mute is disabled and the guard tone is applied to the mixer. The timer 25 will apply an inhibit signal to the attenuator 28 so that the full amplitude of the guard tone is applied to the mixer 32. At the end of the 100 millisecond time period of timer 25, the attenuator inhibit will be removed so that the guard tone level would be reduced 30 decibels by the attenuator were it not blocked by the mute circuit 30. The timer 36 will start its time period at the end of the period of timer 25, and will apply a ground to the tuning capacitors 16 so that the capacitor which is connected by an operated switch 12 to 15 will control the frequency of oscillator 34. The timer 36 will also energize the oscillator 34 so that a function tone therefrom is applied to the mixer 32. This will continue for the 25 millisecond time period.

The timer 36 will cause the mute circuit 30 to block the guard tone during the transmission of the function tone. For voice transmission, at the end of the 25 millisecond function tone period, the mute circuit 30 will again be inhibited by the action of the push-to-talk switch so that the guard tone will be transmitted attenuated by 30 decibels with the voice transmission.

The action of the encoder is illustrated by FIG. 2 wherein the time A represents the time of operation of the push-to-talk switch 10. The guard tone will be applied at a high level from the time A to the time B, which represents 100 milliseconds. At this time the function tone generator will operate to provide the function tone for the 25 millisecond period from time B to time C. The guard tone will be muted from time B to time C, and will be transmitted again at reduced level with the voice transmission at time C and until the push-to-talk switch is released at time D. As shown by FIG. 2, the function tone transmitted between times B and C is at a lower level (amplitude) than the original guard tone transmission between times A and B, and the subsequent guard tone transmission between times C and D is at a level still lower than that of the function tone.

For providing a function other than voice transmission, the operation will be initiated by actuation of one of selectors 18 or 19. These are representative of a larger number of selectors as may be desired in a particular system. This will apply a trigger pulse from switch 21 or 23 to the 100 millisecond timer 25, and this timer inhibits the action of attenuator 28 and of the guard tone mute circuit 30 so that the guard tone will be transmitted at full amplitude for the 100 millisecond timer period. At the end of the time period of timer 25, timer 36 will be actuated to operate function tone oscillator 34 and to provide a ground to the circuit including switches 22 and 24 so that the capacitor 16 connected to the actuated switch will be connected in the circuit of oscillator 34 to control the frequency thereof. Accordingly, for the 25 millisecond period of timer 36, the function tone will be applied to the mixer 32, and to the line to the base station. Since there is no voice transmission, the control tones will be terminated after the 25 millisecond period. Thus, the transmission terminates at time C in the chart of FIG. 2.

Considering now the decoder at the base station, the output of the encoder which is applied to the line driver 37 is applied through some suitable channel to the line driver 38 at the base station. This may be a wire line or any other audiochannel which transmits signals having frequencies in the range from 300 to 2200 hertz. The line driver 38 applies signals from the remote station to selective amplifier 39, and amplified signals are applied to guard tone detector 40. This detector responds to the received tone, and applies a trigger voltage to the 100 millisecond timer 42. The guard tone detector also applies a voltage on line 43 which may be connected to a radio transmitter 45 and a radio receiver 46 at the base station. This voltage keys the transmitter so that it is prepared to transmit a voice signal, and mutes the receiver so that signals from the receiver will not be applied on the audiochannel between the remote and base stations. By muting the receiver, the channel is clear so that the function tone signals can be transmitted over the channel without interference therefrom.

The timer 42 applies an enabling pulse to AND gate 48 so that this AND gate is operative for 100 milliseconds. Tone signals from the amplifier 39 are also applied to the AND gate 48 and when this AND gate is enabled, these signals are applied by the AND gate 48 to the function tone detectors 50 to 55. The function tone detectors 50 to 53 respond to the tones transmitted by operation of the switches 12 to 15 at the remote station and control channel elements No. 1 to No. 4 in the transmitter 45 which determine the frequency of the carrier waves transmitted thereby. The function tone detectors 54 and 55 respond to the frequencies produced when the switches 22 and 24 of the function selectors at the remote station are operated. An OR gate 49 is connected to the outputs of the detectors 50 to 53 and provides an output when any one of these detectors responds. The output of the OR gate 49 is applied to the AND gate 48 to block the same so that the function tone is no longer applied to the detectors 50 to 55 after one detector has responded. This prevents false operation of a second detector from incidental reception of the frequency to which it responds, which might be present in speech or other signals on the line. The OR gate 49 is not coupled to function detectors 54 or 55 as the tones to which these detectors respond are not followed by speech.

Referring again to FIG. 2, the guard tone detector 40 will respond to the guard tone transmitted some time during the 100 millisecond period of the guard tone, such as at the time E which is 60 milliseconds after the tone was initiated at time A. This will cause the timer 42 at the base station to be operated to enable the AND gate 48 for a 100 millisecond period which will extend from the time E to the time F, shown in FIG. 2. During this time period a function tone will be transmitted starting at time B, and the function tone detector will respond promptly thereafter at the time indicated as G. The function tone will then stop at time C, as previously stated, and the guard tone will again be transmitted at low level during voice transmission up to time D when the push-to-talk switch is released. If there is no voice transmission, the tone signals will terminate at time C.

The base station (FIG. 1) includes an activity checker 58 which responds to the tone signals from amplifier 39. This detects the termination of the tone signals and applies a reset voltage to the guard tone detector 40 so that the decoder is ready for another control operation.

Audiosignals applied from the remote station to the base station over the single audiochannel are applied from line driver 38 through notch filter 56 to the transmitter 45, so that audiosignals from the remote station can modulate the wave transmitted thereby. The notch filter 56 removes the low level guard tone applied to the base station during voice transmission so that this is not transmitted by the transmitter 45 and received by listening receivers. Similarly, audiosignals from the receiver 46 are applied through notch filter 57 to the line driver 38. The notch filter 57 removes components at 2175 hertz from the received speech or noise which is applied to the line driver 38 to prevent interference with the guard tone operation, to thereby avoid falsing of the guard tone detector. As previously stated, the receiver 46 is muted by action of the guard tone so that audiosignals will not be applied to the line driver 38 and over the line to the remote station. This makes the control of the base station by the remote station more reliable.

Figure 3:
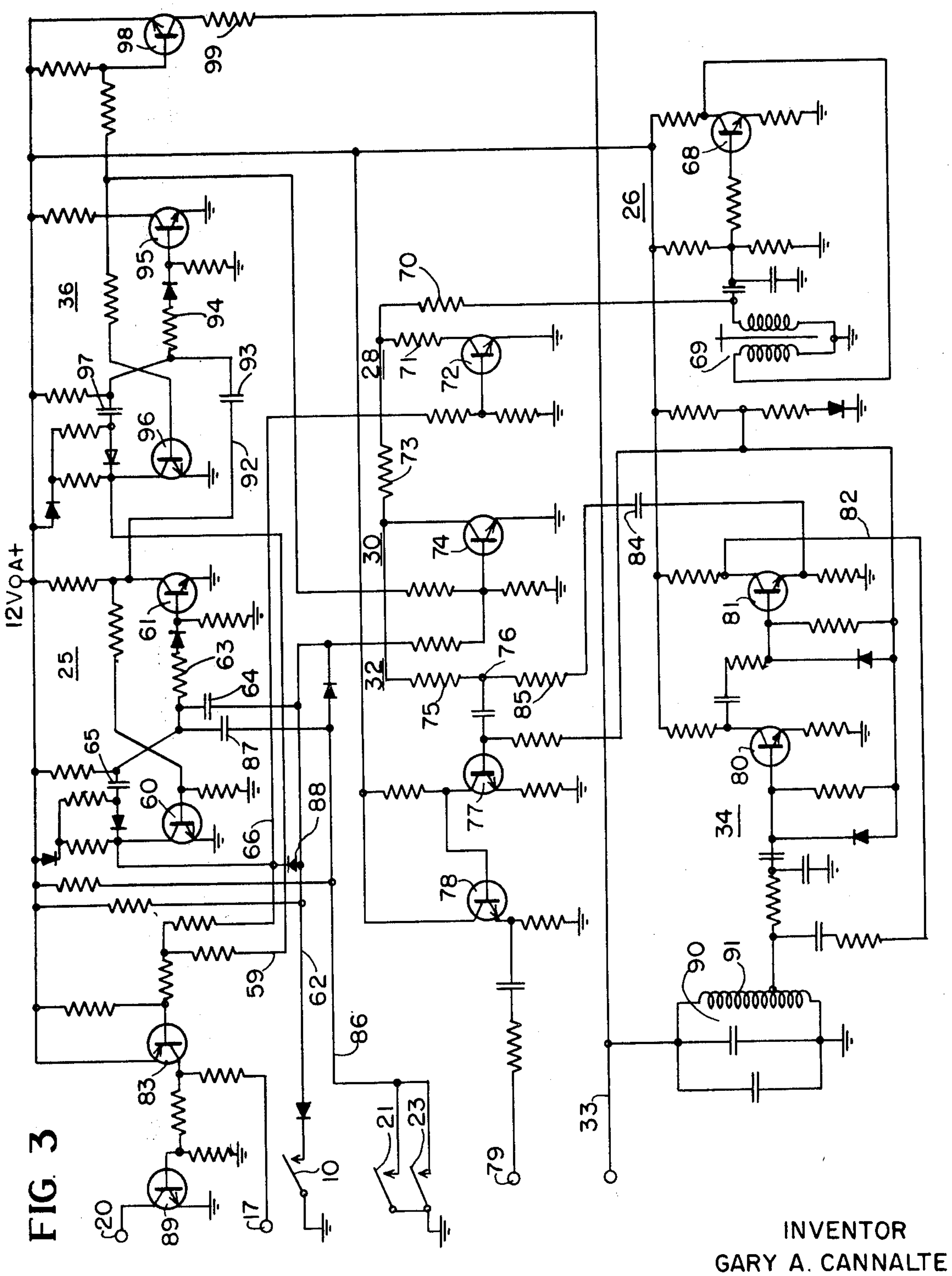
FIG. 3 is a circuit diagram of the encoder illustrated in FIG. 1.

FIG. 3 is the circuit diagram of the encoder of the system of FIG. 1. The timer 25 is formed by the multivibrator including transistors 60 and 61. Transistor 60 is normally nonconducting and transistor 61 is normally conducting. When the switch 10 is closed, conductor 62 is grounded and capacitor 64 is charged to apply a negative potential through resistor 63 to the base of transistor 61 to cut off this transistor. Transistor 60 will, therefore, be rendered conducting for a time period depending upon the time required for capacitor 65 to charge. As previously stated, this timer may have a period of 100 milliseconds. When transistor 60 conducts the conductor 66 connected to its collector is grounded. When transistor 60 is not conducting, conductor 66 is at the positive potential provided at the terminal A+, which may be 12 volts.

The guard tone oscillator 26 of the system includes transistor 68, and frequency selective reed device 69 which provides feedback between the collector and base of transistor 68 at the resonant frequency of the device 69. This oscillator operates continuously to provide the guard tone frequency. The guard tone oscillations are applied from oscillator 26 through resistor 70 to the attenuator 28 which includes resistor 71 and transistor 72. When the transistor 72 conducts, resistor 71 shunts the guard tone to ground, and this attenuates the level of the guard tone. The conduction of transistor 72 is controlled by the potential on conductor 66, and during the period of timer 25 this conductor is held at ground potential to hold the transistor 72 nonconducting. At other times conductor 66 is at a positive potential which renders the transistor 72 conducting to provide the attenuator action.

The path for the guard tone signal continues from the attenuator 28 through resistor 73 to the mute circuit 30. The mute circuit is formed by transistor 74 which is normally conducting to short the guard tone applied through resistor 73 to ground. When the switch 10 is operated and the conductor 62 is grounded, this applies ground to the base of transistor 74 to cut off this transistor so that the muting action is disabled. When switch 10 is not operated (and transistor 60 is not conducting), the positive A+ potential is applied by conductor 62 to the base of transistor 74 and this renders transistor 74 conducting to provide the muting action.

The tone path from the mute circuit 30 continues through resistor 75 to the junction 76 where the guard tone or the function tone may be applied. The tone is then amplified by transistors 77 and 78 and applied to output conductor 79 which applies the tones to the line driver 37.

The function tone oscillator 34 includes transistors 80 and 81, and a parallel tuned circuit 90. Feedback is provided from the collector of transistor 81 through the circuit including conductor 82 to the base of transistor 80 to sustain oscillations, with the frequency being determined by the parallel resonant circuit 90. This circuit is connected to conductor 33 which is connected to the capacitors 16, as shown in FIG. 1, so that the frequency is determined by the particular capacitor which is connected thereto. The output of the oscillator 34 is derived from the emitter of transistor 81 and applied through capacitor 84 and resistor 85 to the junction point 76, and is amplified by transistors 77 and 78 and applied to conductor 79 which applies the tones to line driver 37.

At the end of the time period of timer 25, timer 36 is actuated to start its time period. Transistor 61 of timer 25 is then again rendered conducting to apply a ground to conductor 92. This causes the capacitor 93 which is charged to apply a negative potential through resistor 94 to the base of transistor 95 of the timer 36. This acts to cut off the transistor 95 and render transistor 96 conducting. The time period of timer 36 depends on the time required for capacitor 97 to charge to apply a positive potential to resistor 94.

When transistor 95 is cut off, the positive potential at its collector is applied to the mute circuit 30 to mute the guard tone. This positive potential is also applied to transistor 98 which controls the turn on of the function tone oscillator 34. Transistor 98 is normally conducting to provide current flow therethrough and through resistor 99 to the coil 91 of the tuned circuit 90. This causes a field to build up in coil 91, and when transistor 98 is cut off and the current through coil 91 is terminated, the field of the coil collapses to produce a voltage which charges the capacitors in parallel therewith. This oscillation within the parallel tuned circuit 90 starts the oscillator 34 immediately at the proper frequency and with a minimum of transients. When transistor 98 is again rendered conducting, the resistor 99 is connected to the tuned circuit 90 and this damps the same sufficiently to terminate oscillations. The resistor 99 dissipates the energy to stop the oscillations very rapidly.

Resistors 63 and 94 are provided in the triggering circuits for transistors 61 and 95 of the timers 25 and 36, respectively, to prevent triggering of these timers by noise which may appear on the power supply, or from small changes in voltage on the trigger lines. Although this reduction in the triggering sensitivity is effective to prevent undersired triggering action, it does not disturb the normal triggering action of the timers as required during operation of the system.

When a remote control action is initiated by operation of one of the function selectors 18 or 19 (FIG. 1), the switch 21 or 23 associated therewith provides a ground on line 86 which causes capacitor 87 to apply a negative potential through resistor 63 to the base of transistor 61 to cut off this transistor and start the 100 millisecond time period. This causes transistor 60 to conduct to ground line 66 and thereby disable the attenuator 28. This ground is also applied through diode 88 to line 62 to disable the mute circuit 30. The guard tone is therefore applied at full amplitude to the common point 76. At the end of the 100 millisecond period, timer 36 will be operated, as previously described, and this will cause the function tone oscillator to operate at a frequency determined by the capacitor selected by the switch 22 or 24 (FIG. 1). At the end of the 25 millisecond period of timer 36, the function tone will terminate, and there will be no further transmission of the guard tone as in connection with a voice transmission.

A control circuit is provided to control the audiocircuit 27 and the line driver 37 at the remote station (FIG. 1) during the transmission of the guard tone and the function tones. This operation is provided by transistor 83 which is normally nonconducting and is rendered conducting by the timers 25 and 36. Timer 25 is connected to transistor 83 by the connection from conductor 66 to the base of transistor 83. Conductor 66 is grounded when transistor 60 conducts to drop the voltage applied to the base of transistor 83 to render the same conducting. Similarly, timer 36 is connected through conductor 59 to the base of transistor 83, and this conductor is grounded when transistor 96 conducts to reduce the potential on the base to render transistor 83 conducting when timer 36 operates. Transistor 83 will apply the A+ potential to output terminal 17 when transistor 83 conducts. This terminal is connected to the audio circuit 27 to mute the same, as by muting a compression amplifier therein. This insures that no audio is applied to the line driver at the time that the guard and function tones are applied thereto.

When transistor 83 conducts, a positive potential is applied to the base of transistor 89 to render the same conducting. Transistor 89 when conducting grounds terminal 20 which is connected to the line driver 37 (FIG. 1). This operates to hold the line driver 37 operative when the guard and function tones are applied thereto from terminal 79. This is important as the control may not be held by the operator for the time required for transmission of the guard and function tones and it is desired that the transmission of the control tones be completed each time it is started.

Figure 4:
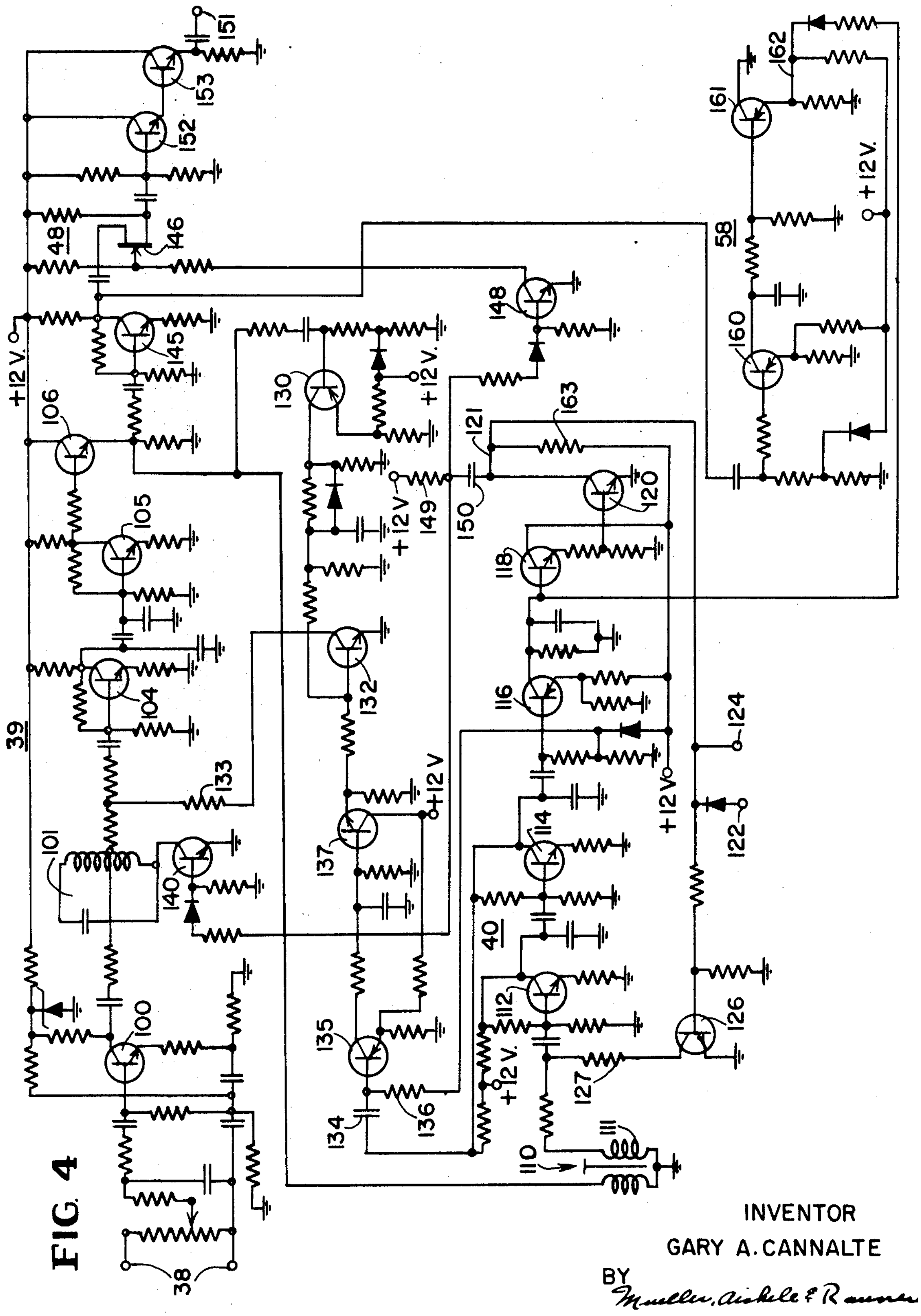
FIG. 4 is a circuit diagram of the decoder illustrated in FIG. 1.

FIG. 4 shows the circuit diagram of the decoder equipment which is shown in block diagram in FIG. 1. Input signals from line driver 38 are applied to selective amplifier 39 which precedes the guard tone detector 40. This is a paraphase amplifier including transistor 100, with the output connected to a filter 101 tuned to the guard tone frequency which, as previously stated, may be 2175 hertz. This increases the gain at the guard tone frequency to accentuate the same. The selected output is applied to the amplifier including transistor 104, and then to the clipper including transistor 105 and the emitter-follower output stage including transistor 106.

The signal from the selective amplifier 39 is applied to the guard tone detector proper 40 which includes a frequency selective device 110, which may be a resonant reed device. The reed is tuned to the guard tone frequency (2175 hertz) and signals of this frequency cause the reed to vibrate to apply signals to the pickup winding 111 thereof. These signals are amplified by transistors 112 and 114 and detected by transistor 116. The detected output is applied to transistor 118 which forms an isolating stage and controls the transistor switch 120. The transistor switch 120 is rendered conducting by the guard tone to apply a ground to conductor 121 connected to terminal 122, which may be connected to the push-to-talk circuit of the base station transmitter to cause operation of this transmitter. Conductor 121 is also connected to terminal 124 which may be connected to the base station receiver and applies a ground thereto to mute the audio thereof so that signals are not applied to the audio channel connected to the remote station.

The switch 120 at the output at the guard tone detector also applies ground to the base of transistor 126 to cut off this transistor to remove the ground from resistor 127. This removes the attenuator action of this resistor so that the gain of the guard tone detector is increased. This action is required because after the original burst of high amplitude guard tone, the amplitude of the guard tone is attenuated at the remote station (30 decibels), and to make up for this, the gain of the guard tone detector is increased after the signal is originally detected.

The operation of the switch 120 also operates through the timing circuit including resistor 149 and capacitor 150 to apply a pulse to transistor 140 which grounds the filter 101. This renders the transistor 140 nonconducting for the time required for capacitor 150 to charge to remove the effect of the filter 101 so that the amplifier 100 will not accentuate the guard tone frequency with respect to the function tone frequencies. The function tone frequencies are therefore effectively amplified by the amplifier 39 after the guard tone has been detected.

The function tone signals at the output of the emitter-follower transistor 106 are also applied to amplifier 145 which applies the signals to the AND gate 48 formed by the field effect transistor 146. This transistor is conducting when the switch 120 of the guard tone detector operates through the timing circuit including resistor 149 and capacitor 150 to turnoff transistor 148. Resistor 149, capacitor 150 and transistor 148 form the timer 42 illustrated in FIG. 1. The values of resistor 149 and capacitor 150 are selected so that transistor 148 will be cut off for a time duration of about 100 milliseconds so that the function tones will be applied through the gate 48 during this period. The tone signals applied through gate 48 are amplified by transistors 152 and 153 which provide a suitable signal at output terminal 151 for driving the function detectors shown by boxes 50 to 55 in FIG. 1.

The signal at the output of transistor 106 is also applied to transistor 130 which operates as a detector to provide a gain control voltage for the amplifier 39. The detected voltage is applied to transistor 132 which is connected in series with resistor 133 to a suitable point in amplifier 39. This can be connected at a point between the filter 101 and the transistor 104, as shown. The transistor 132 is rendered conducting by the detected AGC signal so that resistor 133 functions as an attenuator to reduce the signal in the amplifier 39. This is a fast acting control which causes the signal applied to the frequency selective device 110 to be at the desired level.

A second AGC circuit is also provided and operates from signals at the output of amplifier transistor 114 of the guard tone detector. These signals are applied through capacitor 134 to the base of transistor 135, which functions as a detector. A bias potential is applied through resistor 136 to the base of transistor 135 to delay the action thereof until the signal reaches a particular value. The detected AGC voltage from transistor 135 is applied to transistor 137 which is connected as an emitter-follower to provide a voltage to the attenuator transistor 132. This is a slow acting circuit which operates as previously described to attenuate the signal in amplifier 39 so that the level of signal applied to the guard tone detector transistor 116 is at the desired level.

The activity checker 58 has its input connected to the output of stage 145 of amplifier 39 so that the received tones are applied thereto. Although the guard tone applied to detector 40 is derived at the input of the amplifier 145, the guard tones are amplified thereby along with the function tones and appear at the output. Accordingly, both the guard tone and the function tones will be applied to the input of the activity checker 58. Transistor 160 of the activity checker functions as a detector to detect the presence of tones, and the output thereof operates transistor 161 which forms a switch for grounding conductor 162. Conductor 162 when grounded cuts off transistor 118 so that the transistor switch 120 will be rendered nonconducting. This removes the ground from terminals 122 and 124, and positive potential is applied thereto through resistor 163. This removes the push-to-talk action at the transmitter at the base station, and the disabling of the audio of the receiver thereat. The base station can therefore apply signals over the audio channel to the remote station.

Although the guard tone detector 40 will respond to the failure of guard tone to open the switch 120, this action is relatively slow whereas the action of the activity checker is relatively fast. This permits rapid changeover between receive and transmit operation. However, the guard tone detector forms a fail safe device which opens switch 120 in the event that the activity checker 58 or the control channel fails.

Figures 5, 6:
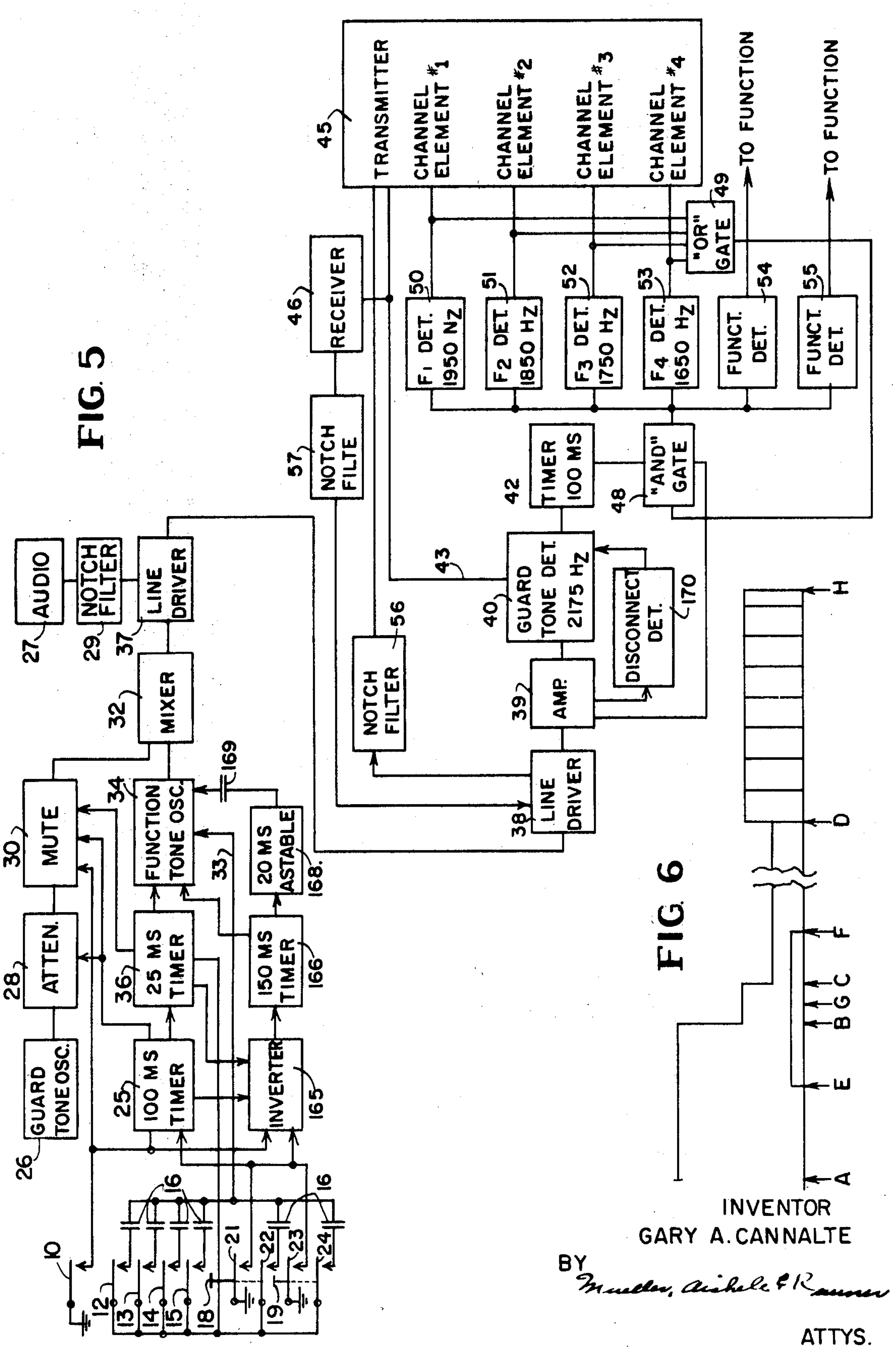
FIG. 5 is a block diagram of a second embodiment of the invention.
FIG. 6 is a chart illustrating the operation of the system of FIG. 5.

FIG. 5 illustrates a modification of the remote control system shown in FIG. 1 wherein a disconnect signal is transmitted at the end of each control tone transmission from the remote station. The components in the system of FIG. 5 which are the same as in FIG. 1 are given the same numbers, and the description of the operation of the part of the system which is common will not be repeated.

In the system of FIG. 5 an invertor 165 is added which is connected to the conductors from push-to-talk switch 10 and from function switches 21 and 23. This invertor produces an output when either the switch 10 or the switch 21 or 23 is released if timers 25 or 36 are not active. The invertor 165 initiates operation of 150 millisecond timer 166 which actuates the function tone oscillator 34 and also initiates operation of astable circuit 168. The astable circuit connects capacitor 169 to the function tone oscillator for alternate periods of 20 milliseconds. Actuation of the function tone oscillator 34 by the 150 millisecond timer will cause operation thereof at a frequency such as 2000 hertz, and when the capacitor 169 is connected to the oscillator 34 by the astable circuit, the frequency will change to 1500 hertz. During the 150 millisecond period, seven alternations of the tones will take place, and these tones from the function tone oscillator are applied through the mixer 32 to the line driver 37 and over the audio channel to the line driver 38 at the base station.

At the base station the disconnect tones will be applied from the line driver 38 to the amplifier 39 and will be amplified and applied to the disconnect detector 170. The detector will respond in a period of the order of 70 milliseconds during which three alternations of the tone will take place. The disconnect detector 170 acts to release the guard tone detector 40 in the same manner as described in connection with the release thereof by the activity checker 58 in the system of FIG. 1.

FIG. 6 illustrates the operation of the system of FIG. 5. This operation is essentially the same as in the system of FIG. 1 up to the time D when the push-to-talk switch is released. At this time the alternate disconnect tones of 1500 hertz and 2000 hertz are transmitted for the 150 millisecond period up to the time H. The disconnect tones are transmitted by the function tone oscillator 34 at the same level that the function tones are transmitted between times B and C. In the event that there is no voice transmission the burst of tone will be transmitted immediately following the function tone, starting at time C.

I claim:

1. A remote control system for providing signals over an audio channel wherein the efficiency of transmission decreases above a given frequency, including in combination:

oscillator means for producing guard tone oscillations at a first frequency below the given frequency and at a first amplitude level, said oscillator means selectively producing tone oscillations at a number of frequencies below the given frequency and different from the first frequency and at a second amplitude level below said first amplitude level, control means including timer means and control switch means connected to said timer means initiating remote control operation, said timer means including a first portion for producing a first control during a first time period and a second portion for producing a second control during a second time period following said first time period, and means connecting said timer means to said oscillator means for applying said first and second controls thereto, said control switch means being operable to initiate operation of said timer means to cause said oscillator means to provide guard tone oscillations of said first amplitude level in response to said first control during said first time period and to cause said oscillator means to provide oscillations at a different frequency and at said second amplitude level in response to said second control during said second time period.

2. The remote control system of claim 1 wherein said oscillator means includes a first portion for producing guard tone oscillations and a second portion for selectively producing tone oscillations of different frequencies.

3. The system of claim 2 wherein said control means includes selector means connected to said second portion of said oscillator means to control the frequency of oscillations produced thereby.

4. The system of claim 1 wherein said oscillator means includes a tuned circuit having a coil, and further switch means connected to said coil to provide current through said coil and to block the flow of current therethrough to thereby produce an oscillation in said tuned circuit to start said oscillator means.

5. The system of claim 4 wherein said control means includes a plurality of capacitors and selector means for selectively connecting said capacitors to said tuned circuit for controlling the frequency of said oscillator means.

6. The system of claim 1 wherein said oscillator means includes attenuator means for reducing the amplitude of said guard tone oscillations, and said first portion of said timer means applies said first control to said attenuator means to inhibit the same so that said guard tone oscillations are applied to the audio channel at said first amplitude level during the first time period.

7. The remote control system of claim 1 wherein said oscillator means includes muting means and attenuator means coupled to said timer means for controlling the guard tone oscillations, and wherein said timer means inhibits said muting means and said attenuator means during the first time period to provide guard tone oscillations and inhibits said muting means at the end of the second time period so that guard tone oscillations are provided at reduced level.

8. The remote control system of claim 7 wherein said second portion of said timer means actuates said muting means to block the transmission of guard tone during the second time period.

9. The remote control system of claim 1 including further means responsive to release of said control switch means for causing said oscillator means to provide tones which alternate between two different frequencies for disconnect action.

10. The remote control system of claim 9 wherein said further means includes a timer operated in response to release of said switch means, astable means coupled to said timer, means coupling said timer to said oscillator means to cause operation thereof for a third time period, and means coupling said astable means to said oscillator means for alternately changing the frequency of the tone produced thereby between a pair of frequencies.

11. A remote control system for applying control signals from a remote station to a base station over a channel on which audiosignals are applied from said remote station to said base station and from said base station to said remote station, and wherein the efficiency of transmission of the channel decreases above a given frequency, with audio signals above a given amplitude level being permitted on said audiochannel for only a limited time duration, said system including in combination:

apparatus at the remote station including generator means for providing first oscillations of a first frequency at an amplitude level above said given amplitude level, and for providing second oscillations at a frequency different from said first frequency at an amplitude level below said given amplitude level, and control means for selectively applying said first oscillations to the audiochannel for a first time duration less than said limited time duration and for applying second oscillations thereto following said first oscillations; and apparatus at the base station including first means for applying audiosignals to the audiochannel, second means for receiving signals from the audiochannel, and means coupled to said second means and responsive to said first oscillations for rendering said first means inoperative to apply signals to the audiochannel, so that said second oscillations are applied to the audiochannel at the remote station in the absence of signals applied thereto from the base station.

12. The remote control system of claim 11 wherein said generator means at the remote station includes means for changing the frequency of said second oscillations so that control signals of different frequencies are produced, and including detector means at the base station responsive to the frequency of said second oscillations to provide different control operations.

13. The remote control system of claim 12 including gate means at the base station responsive to said first oscillations for applying the second oscillations to said detector means.

14. The remote control system of claim 12 including means at the base station coupled to said second means and responsive to the termination of said first and second oscillations to provide disconnect action to enable said first means to apply audiosignals to the audiochannel and to condition said detector means for a further control action.

15. The remote control system of claim 11 including push-to-talk switch means at the remote station connected to said control means and causing operation thereof following the application of second oscillations thereto and for the duration of the operation of said push-to-talk switch means to apply to the audiochannel oscillations of the first frequency at an amplitude level below said given amplitude level.

16. The remote control system of claim 11 wherein said control means causes said generator means to apply to the audiochannel at the termination of the control signal oscillations alternating between second and third frequencies, and wherein said second means at the base station includes detector means responsive to said oscillations alternating between said second and third frequencies to provide disconnect action at the base station and thereby permit said first means to apply audiosignals to the audio channel.

17. The remote control system of claim 11 wherein said apparatus at said base station includes amplifier means coupled to said second means and having selective means tuned to the frequency of said first oscillations to increase the gain at such frequency, first detector means coupled to said amplifier means for providing a control voltage in response to said first oscillations, second detector means responsive to said second oscillations to provide control action in accordance with the frequency of said second oscillations, and gate means coupling said amplifier means to said second detector means and responsive to said control voltage for passing to said second detector means said second oscillations which follow said first oscillations.

18. The remote control system of claim 17 including switch means responsive to said control voltage for disabling said selective means to increase the gain of said amplifier means for said second oscillations.

19 The remote control system of claim 17 including automatic gain control means coupled to said amplifier means for controlling the gain thereof in accordance with the signal at the output of said amplifier means.

20. The remote control system of claim 19 wherein said automatic gain control means includes a first relatively slow acting portion responsive to the level of the oscillations in said amplifier means, and a second relatively fast acting portion responsive to the level of the oscillations in said first detector means.